United States Patent

De Boer

[15] 3,676,657

[45] July 11, 1972

[54] TWO REGISTER PARALLEL BINARY ADDER/SUBTRACTOR

[72] Inventor: Eeltje De Boer, Emmasingel, Eindhoven, Netherlands

[73] Assignee: U.S. Philips Corporation, New York, N.Y.

[22] Filed: June 4, 1970

[21] Appl. No.: 43,518

[30] Foreign Application Priority Data

June 7, 1969 Netherlands..........................6908710

[52] U.S. Cl................................................................235/175
[51] Int. Cl.............................................................G06f 7/50
[58] Field of Search....................................................235/175

[56] References Cited

UNITED STATES PATENTS

| | | | |
|---|---|---|---|
| 3,290,494 | 12/1966 | Schnererger et al. | 235/175 |
| 3,320,410 | 5/1967 | Barrett et al. | 235/175 |
| 3,375,358 | 3/1968 | Franck | 235/175 |
| 3,417,236 | 12/1968 | Utley | 235/175 |
| 3,488,481 | 1/1970 | Franck | 235/175 |

*Primary Examiner*—Eugene G. Botz
*Assistant Examiner*—David H. Halzahn
*Attorney*—Frank R. Trifari

[57] ABSTRACT

Binary arithmetic member for adding and subtracting binary numbers, in which the input register and the accumulator have connected between them a control-device comprising a sensing circuit for sensing the least significant bit place, where the binary number to be added or subtracted has a bit value "1," whose outputs corresponding to the respective bit places of the binary number are connected to the corresponding inputs of the accumulator so that under the control of a starting pulse that bistable flip-flop of the accumulator changes its state which ordinally corresponds to said least significant bit place where the binary number to be added or subtracted has a bit value "1," said control-device comprising furthermore a gate circuit which, together with the sensing circuit, satisfies a given logical equation, so that a simple arithmetic member is obtained. A special device is provided for adding to or subtracting from the result in the accumulator an additional binary number 1 when the accumulator passes the zero position (FIGS. 2, 2*a*, 2*b*, 2*c*, 2*d*).

7 Claims, 9 Drawing Figures

INVENTOR.
EELTJE DE BOER

BY

AGENT

INVENTOR.
EELTJE DE BOER
BY
AGENT

INVENTOR.
EELTJE DE BOER
BY

AGENT

INVENTOR.
EELTJE DE BOER

BY

[signature]

AGENT

INVENTOR.
EELTJE DE BOER
BY
Frank R. Trifari
AGENT

TWO REGISTER PARALLEL BINARY ADDER/SUBTRACTOR

The invention relates to arithmetic units and more specifically to a binary adding arithmetic member comprising an accumulator in which a first binary number can be received, the accumulator consisting of a plurality of bistable flip-flops having states characterized by 0 and 1, and an input register in which a second binary number can be received. A control-device is provided having inputs to which are connected the outputs of the accumulator and the outputs of the input register, the control-device producing control-signals for the adjustment of an adding result in the accumulator. The accumulator is controlled so that in order of succession those bistable flip-flops change their states at the consecutive bit places of the accumulator for which, on the basis of a 0-to-1 change-over of a preceding bistable flip-flop, a next-following corresponding bit place of the second binary number has a bit value 1 and for which, on the basis of a 1-to-0-change-over of a preceding bistable flip-flop a next-following, corresponding bit place of the second binary number has a bit value 0.

Binary adding arithmetic members are known wherein the adding process is chosen so that only those bistable flip-flops of the accumulator change their states which have, in fact, to do so in order to form the result (see Richards: "Arithmetic Operations in digital Computers," 1957, pages 110, 111 and 124). Many practical embodiments have been designed on the basis of said adding process in order to obtain adding arithmetic members operating at maximum speed, while the number of components remained within reasonable limits. In the present development of integrated circuits it has become apparent that parts of given devices such as adding arithmetic members operate with such speeds that the addition times of such an arithmetic member are well within the limits of the operation times of the devices surrounding the arithmetic member and co-operating therewith, for example a memory store. At present arithmetic members are being used in a growing number of fields, particularly where these members co-operate more or less directly with memory stores, which are comparatively cheap and hence comparatively slow so that a high arithmetic speed cannot be effectively utilized. In this respect an adding arithmetic member is sometimes evalued in the first place not for its maximum speed of operation but rather for its complexity and flexibility. The invention therefore has for its object to provide a binary adding arithmetic member which is simple in construction and easy to handle and which has a given time of operation determined especially by the use of integrated subassemblies and being of the order of magnitude of that of the devices, for example, cheaper memory media, surrounding the arithmetic member.

For the successive control of the binary stages said known device requires a counter giving off at given instants an arithmetic instruction in order of succession for each of the stages. The arithmetic member according to the invention performs the adding operation fully automatically without the need for such a counter. For this purpose the binary adding and subtracting arithmetic member according to the invention is characterized in that the control-device comprises a sensing circuit for sensing the least significant bit place where said second binary number has a value 1. The outputs of the control device corresponding to the respective bit places of the binary number are connected to the corresponding inputs of the accumulator so that by a starting-pulse instruction under the control of the sensing circuit that bistable flip-flop of the accumulator which corresponds ordinally to said least significant bit place where the second binary number has a bit value 1 changes its state. The control-device comprises a gate circuit which together with said sensing circuit satisfies the following logical equation, so that a control-signal is applied to an output $T_i$ for controlling an $i^{th}$ bistable flip-flop of the accumulator, where $T_i$ =

$$\overline{\bar{c}_0 \cdot \bar{c}_1 \ldots \bar{c}_{i-1} \cdot c_i} + \overline{\Delta A_0 \cdot c_1 \ldots c_{i-1} \cdot \bar{c}_i} + \overline{\Delta A_1 \cdot c_2 \ldots c_{i-1} \cdot \bar{c}_i} \ldots + \overline{\Delta A_{i-1} \cdot c_{i-1} \cdot \bar{c}_i} + \overline{\Delta A_{i-2} \cdot \bar{c}_i} + \Delta B_0 \bar{c}_1 \ldots \bar{c}_{i-1} \cdot c_i + \Delta B_1 \cdot \bar{c}_2 \ldots \bar{c}_{i-1} \cdot c_i + \ldots + \Delta B_{i-2} \cdot \bar{c}_{i-1} \cdot c_i + \Delta B_{i-1} \cdot c_i$$

wherein $c_o, c_i, \ldots$, are bit values of the ordinally consecutive bit places of the second binary number and the $\Delta A_i$ and $\Delta B_i$ represent the 1-to-0 changes of state of the complementary outputs ($A_i$, $B_i$) of a bistable flip-flop ($FF_i$) of the accumulator.

This arithmetic member enables not only addition but also subtraction. Starting from a 0-state subtracting is equal to adding, the result having a negative sign. The binary adding arithmetic member according to the invention may be extended in a simple manner for non-ordinal addition and subtraction of binary members. The arithmetic member according to the invention is in this respect characterized in that the bistable flip-flops of the accumulator are provided with addition-subtraction control. In the event of subtraction $\Delta A_i$ in said logical equation can be replaced by $\Delta B_i$ and $\Delta B_i$ by $\Delta A_i$. The arithmetic member further includes a signalling device for assessing zero passage of the accumulator as a whole, the signalling device including a bistable sign flip-flop which supplies an additional binary number 1 to be subtracted from the result in the accumulator, when the accumulator passes through zero from positive to negative due to the subtraction, whereas the bistable sign flip-flop provides a binary number 1 additionally to be added to the result in the accumulator, when the accumulator passes through zero from negative to positive due to an addition. Consequently, the arithmetic time is twice the normal value when the accumulator passes through the 0-position. Where given sequences of binary numbers have to be added and subtracted in arbitrary order, the accumulator may pass many times through 0. If, as stated above, an additional 1 has to be added to or subtracted from the result of each passage of the accumulator through zero, the total arithmetic time required for such a sequence of additions and subtractions may be considerably prolonged. For mitigating this drawback the addition and subtraction arithmetic member according to the invention is characterized in that the signalling device comprises an additional bistable flip-flop, which retains the state of the bistable sign flip-flop at the beginning of a series of additions and subtractions, the addition or subtraction of an additional binary number 1 being performed only when after said series the state of the bistable flip-flop of the sign differs from the state of said additional bistable flip-flop.

It should be noted that by the arrangement according to the invention a subtraction can also be performed on the principle of adding the number to be subtracted in a complementary form. In this case, however, at each subtraction that occurs without the accumulator passing from positive to negative through zero, an additional 1 is added. For this purpose an arithmetic member according to the invention is characterized in that the input register is provided with a gate circuit by which, in subtracting, the second binary number is fed in the inverted form in the arithmetic member so that in the logical equation $c_i$ can be replaced by $\bar{c}_i$ and $\bar{c}_i$. The arithmetic member includes a signalling device supplying an additional 1 to be added to the result in the accumulator at each subtraction and at the passage of the accumulator through zero from negative to positive.

Thus the average arithmetic time is prolonged by a factor 2. However, in the case of an arbitrary order of additions and subtractions the arithmetic time will yet decrease because in subtracting from positive to negative no additional 1 need be subtracted from the result when the accumulator passes through zero. More efficient operation is nevertheless possible by taking a step as referred to above, for example, by including a small 2-way counter which assesses, after a series of additions and/or subtractions, which total number has to be added in addition to the final result in order to obtain a correct final result. A further arithmetic member embodying the invention is characterized in that signalling device further includes a 2-way counter which registers the number of times of subtractions and passages of the accumulator through zero from negative to positive in one series of additions and subtractions, the position of said 2-way counter being added to the result in the accumulator after one such series.

It appears that the addition and subtraction member in accordance with the invention is especially suitable for reducing the arithmetic time particularly by its structure. For fixing the arithmetic time the least favorable case has to be taken into account in which all bistable flip-flops of the accumulator change their states. In practice this will occur rarely.

The arithmetic time for each adding and subtracting operation is usually shorter and is mainly determined by the number of bistable flip-flops having to change their states. It is always certain that those bistable flip-flops will not change their states for which the consecutive bit places of the second binary number have 0's from the least significant bit place. The first change is only possible from said least significant bit place where the second binary number has a bit value 1. Further changes may occur throughout the length of the accumulator, but this is not always true. When the last change can be sensed, this means a high average economy in arithmetic time. In order to achieve the aforesaid increase in operational time of the arithmetic member the binary addition member is in this respect characterized in that the output of the control-device for the control-signal ($T_{n+1}$) of the last stage of the control-device and the output of the control-device for the signal ($\Delta B_i \cdot \overline{c}_{i+1} \cdot \overline{c}_{i+2} \cdots \overline{c}_n$) produced in the 1st stage due to the change-over of an ordinally higher preceding bistable flip-lop are connected to a starting pulse generator (P, $Q_1$, $Q_2$) which provides a starting pulse ($St_1$) after the appearance of one of said two signals.

In the case of an arbitrary order of additions and subtractions it should be ensured at the passage of the accumulator through zero that any control-signal from the last stage of the control-device must not result in a new state. First the whole arithmetic process has to be completed (the addition or subtraction of the additional 1 at the occurrence of an end-around-carry). According to this aspect a further binary adding and subtracting arithmetic member embodying the invention is characterized in that a number of AND-gates (17,...... 20) is provided. To each input of such AND-gates are connected an output of the bistable sign flip-flop, an adding or subtracting instruction line and the more or less delayed control-signal ($T_{n+1}$) of the last stage of the control-device, so that the control-signal ($T_{n+1}$) of the last stage of control-device can attain the starting pulse generator (P, $Q_1$, $Q_2$), only if required after the passage of the accumulator through zero, when the adding or subtracting process is completed.

The invention will be described hereinafter more fully with reference to the drawing.

In the drawing:

FIG. 1 shows schematically a binary addition arithmetic member in accordance with the invention.

FIG. 2 and FIGS. 2*a* to 2*d* show an embodiment of a binary adding and subtracting arithmetic member for adding and subtracting binary numbers in arbitrary order in accordance with the invention.

It should be noted that corresponding parts are designated in the Figures by the same references.

Figure 1:
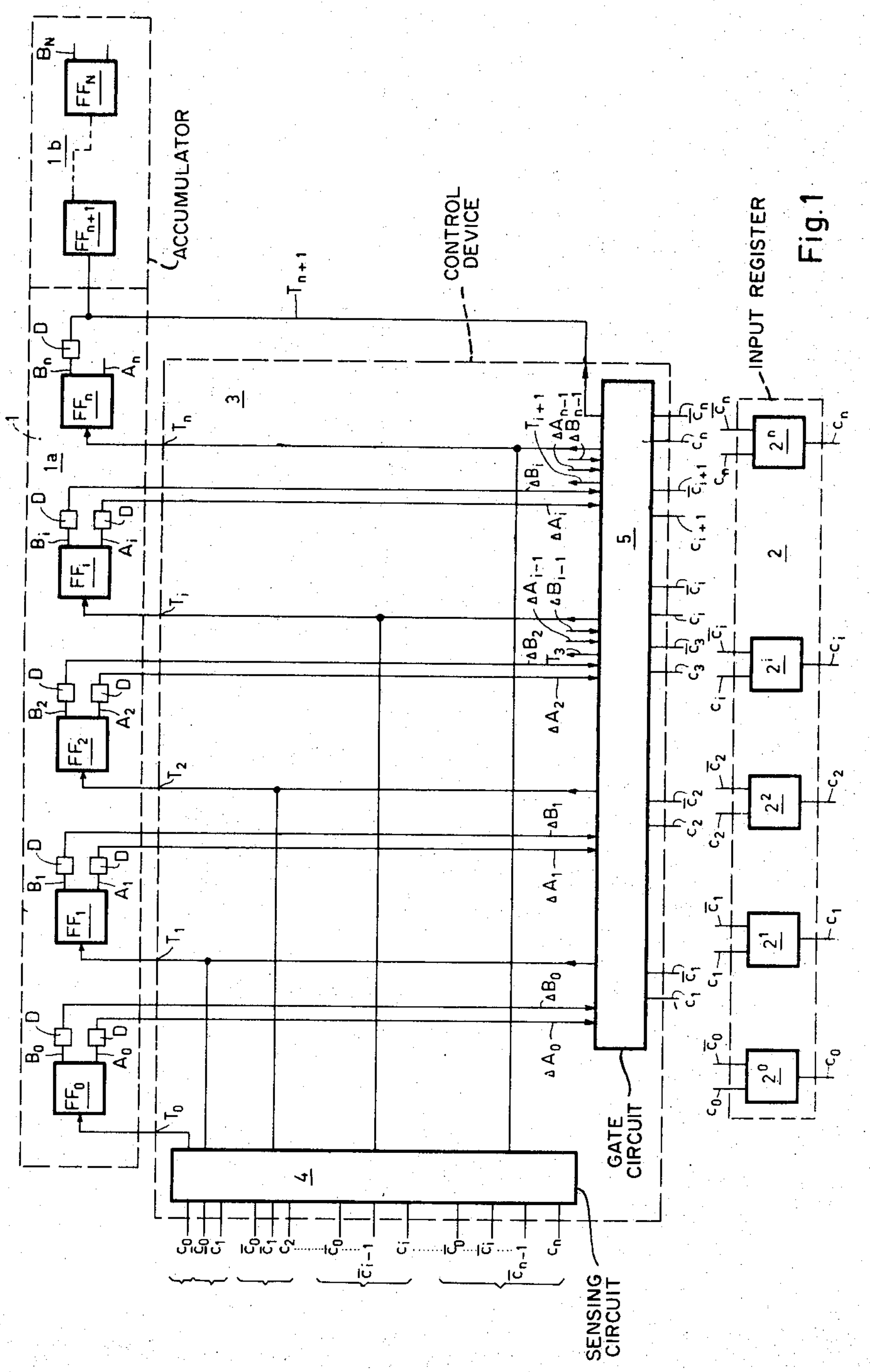

FIG. 1 shows schematically a binary adding arithmetic member in accordance with the invention. Reference numeral 1 designates the accumulator comprising a portion 1*a* having bistable flip-flops $FF_o$, $FF_1$, ........$FF_n$ and a portion 1*b* having bistable flip-flops $FF_{n+1}$,......$FF_N$. The latter group of flip-flops of portion 1*b* serve for processing the overflow of the preceding portion 1*a*. If $m$ binary numbers with $n$ bits are added, the number of required bistable flip-flops is $n + p$, where $p$ originates from $2^p \geq m > 2^{p-1}$, for example, if $m = 100$, $p$ is 7, so that, for example, if $n = 6$, the total number of flip-flops $N = n + p = 13$. Reference numeral 2 designates the input register having in this case $n$+1 bistable flip-flops $2^o, 2^1, \ldots 2^n$. The input register supplies the second binary number $c_o, c_1, c_2 \ldots c_n$ and the complement thereof $\overline{c}_o, \overline{c}_1, \ldots \overline{c}_n$. Reference numeral 3 designates the control-device comprising the sensing circuit 4 and the gate circuit 5. The sensing device 4 receives in the groups indicated the signals $c_o$; $\overline{c}_o, c_1$; $\overline{c}_o, \overline{c}_1, c_2$;... $\overline{c}_o, \overline{c}_1 \ldots \overline{c}_{i-1}, c_i$; $\overline{c}_o, \overline{c}_1 \ldots \overline{c}_{n-1}, c_n$. The sensing circuit 4 determines at which least significant bit plate $i$ of the second binary number $c_o, \ldots c_n$ a bit value 1 is present. Thus an output $T_i$, which is in addition an output of the control-device 3, has a control-signal for the bistable flip-flop concerned $FF_i$ of the accumulator 1. The gate circuit 5 comprises gates to which are transmitted the signal variations $\Delta A_o$, $\Delta B_o$, $\Delta A_1$, $\Delta B_1$, $\Delta A_2$, $\Delta B_2$; ... $\Delta A_i$, $\Delta B_i$, ... $\Delta A_n$, $\Delta B_n$ appearing at the outputs of the respective bistable flip-flops $FF_o$, $FF_1$, ... $FF_n$, for example, by means of for example differentiating networks D in the case of change-over of state. The gate circuit 5 also receives the signals $c_1, \overline{c}_1$; ... $c_n, \overline{c}_n$. The outputs of the gate circuit 5 in conjunction with the outputs of the sensing circuit 4 form the outputs $T_1$, $T_2$, ... $T_i$, ... $T_n$ of the control-device 3. An output $T_i$ conveys a control-signal for a corresponding bistable flip-flop $FF_i$, if:

$$T_i = \overline{\overline{c}_o \cdot \overline{c}_1 \ldots \overline{c}_{i-1}, c_i} + \overline{\Delta A_o \cdot c_1 \ldots c_{i-1} \cdot \overline{c}_i} + \overline{\Delta A_1 \cdot c_2 \ldots c_{i-1} \cdot \overline{c}_i} + \ldots + \overline{\Delta A_{i-2} \cdot c_{i-1} \cdot \overline{c}_i} + \overline{\Delta A_{i-1} \cdot c_i} + \overline{\Delta B_o \cdot \overline{c}_1 \ldots \overline{c}_{i-1} \cdot c_i} + \overline{\Delta B_1 \cdot \overline{c}_2 \ldots \overline{c}_{i-1} \cdot c_i} + \ldots + \overline{\Delta B_{i-2} \cdot \overline{c}_{i-1} \cdot c_i} + \overline{\Delta B_{i-1} \cdot c_i}.$$

In this logical equation a "·" represents the and-function and "+" represents the or-function.

Substituting 0–5 for $i$, $$T_o = \overline{c_o}$$

$$T_1 = \overline{\overline{c}_o \cdot \overline{c}_1} + \overline{\Delta_{Ao} \cdot \overline{c}_1} + \overline{\Delta B_o \cdot c_1}$$

$$T_2 = \overline{\overline{c}_o \cdot \overline{c}_1 \cdot c_2} + \overline{\Delta A_o c_1 \cdot \overline{c}_2} + \overline{\Delta A_1 \cdot \overline{c}_2} + \overline{\Delta B_o \overline{c}_1 \cdot c_2} + \overline{\Delta B_1 c_2}$$

$$T_3 = \overline{\overline{c}_o \cdot \overline{c}_1 \cdot \overline{c}_2 \cdot c_3} + \overline{\Delta A_o c_1 c_2 \overline{c}_3} + \overline{\Delta A_1 c_2 \cdot \overline{c}_3} + \overline{\Delta A_2 \cdot \overline{c}_3} + \overline{\Delta B_o \cdot \overline{c}_1 \cdot \overline{c}_2 \cdot \overline{c}_3} + \overline{\Delta B_1 \overline{c}_2 \cdot c_3} + \overline{\Delta B_2 \cdot c_3}$$

$$T_4 = \overline{\overline{c}_o \cdot \overline{c}_1 \cdot \overline{c}_2 \cdot \overline{c}_3 \cdot c_4} + \overline{\Delta A_o c_1 c_2 c_3 \overline{c}_4} + \overline{\Delta A_1 c_2 c_3 \overline{c}_4} + \overline{\Delta A_2 c_3 \overline{c}_4} + \overline{\Delta A_3 \overline{c}_4} + \overline{\Delta B_o \overline{c}_1 \cdot \overline{c}_2 \cdot \overline{c}_3 \cdot c_4} + \overline{\Delta B_1 \overline{c}_2 \cdot \overline{c}_3 \cdot c_4} + \overline{\Delta B_2 \overline{c}_3 \cdot c_4} + \overline{\Delta B_3 c_4}$$

$$T_5 = \overline{\overline{c}_o \cdot \overline{c}_1 \cdot \overline{c}_2 \cdot \overline{c}_3 \cdot \overline{c}_4 \cdot c_5} + \overline{\Delta A_o c_1 c_2 c_3 c_4 \overline{c}_5} + \overline{\Delta A_1 c_2 c_3 c_4 \overline{c}_5} + \overline{\Delta A_2 c_3 c_4 \overline{c}_5} + \overline{\Delta A_3 c_4 \overline{c}_5} + \overline{\Delta A_4 \overline{c}_5} + \overline{\Delta B_o \overline{c}_1 \overline{c}_2 \overline{c}_3 \overline{c}_4 \cdot c_5} + \overline{\Delta B_1 \overline{c}_2 \overline{c}_3 \overline{c}_4 c_5} + \overline{\Delta B_2 \overline{c}_3 \overline{c}_4 c_5} + \overline{\Delta B_3 \overline{c}_4 c_5} + \overline{\Delta B_4 \cdot c_5}.$$

It should be noted that a construction completely formed by Nand or Nor elements is taken into consideration, but constructions with and- or or-functions and large-scale integration are also imaginable. The logical function may then be different with respect to the complementary sign above each term of the equation for $T_i$; for example, they may be no complements but the non-complementary values. This type of variants is explicitly associated with the domain of the invention because there are no essential differences.

The operation of the arrangement shown in FIG. 1 is best explained with reference to an example.

It is assumed that the accumulator has a binary number $A = A_5, A_4, A_3, A_2, A_1, A_o = 010011$, this is to say in the complementary form; $B = B_5, B_4, B_3, B_2, B_1, B_o = 101100$. These numbers A and B are consequently the states at the outputs and the complementary outputs respectively of six bistable flip-flops $FF_5$, $FF_4$, $FF_3$, $FF_2$, $FF_1$, $FF_o$.

It is assumed that a binary number $c = c_5, c_4, c_3, c_2, c_1, c_o = 100110$ has to be added. Be it furthermore assumed that a $\Delta A_i$ or $\Delta B_i$ is produced at a change of state from 1 to 0 in a bistable flip-flop $FF_i$. Consequently:

A=010011
B=101100
C=100110

New state

A=111001
B=000110

The result is formed as follows: The sensing circuit 4 senses a bit value for $c_1$, so that $T_1$ obtains a control-signal by which $FF_1$ is changed over. $FF_o$ does not change its state. $FF_1$ was in the state $A_1 = 1$ or $B_1 = 0$ respectively; this becomes $A_1 = 0$, $B_1 = 1$. As a result the 1-to-0 change-over at the $A_1$ output appears as a $\Delta A_1$ signal at the output of the differentiating network D. This $\Delta A_1$ passes to the gate circuit 5 where it produces a next-following control at the output $T_i$ in conjunction with that $c_i$ for which the number $c$ has a bit value 0. Thus $T_3 = \Delta A_1 \cdot c_2 \cdot \bar{c}_3$ (for example by and-gates) is satisfied ($A_1 = 1$, $c_2 = 1$ and $c_3 = 0$ or $\bar{c}_3 = 1$), so that $T_3$ provides a control-signal for the change-over of $FF_3$. $FF_2$ is thus skipped. $FF_3$ was in state $A_3 = 0$ or $B_3 = 1$ and this becomes $A_3 = 1$, $B_3 = 0$. As a result the differentiating network D passes to output $B_3$ a signal: $\Delta B_3 = 1$. This $\Delta B_3 = 1$ passes to the gate circuit 5, where together with that $c_j$ for which the number $c$ has a bit-value 1 it provides a next-following control-signal at output $T_j$. Thus $T_5 = \Delta B_3 \cdot \bar{c}_4 \cdot c_5$ is satisfied so that $T_5$ provides a control-signal for the change-over of $FF_5$. $FF_4$ is thus skipped. Then the addition is completed.

Figure 2:
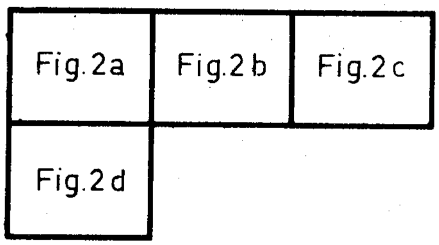

For a better understanding of said gate circuit it will be described in detail in a further example, FIG. 2 and FIGS. 2*a* to 2*d* illustrate a detailed embodiment of a binary adding and subtracting arithmetic member for adding and subtracting binary numbers in an arbitrary order in accordance with the invention. FIG. 2 illustrates how FIGS. 2*a* to 2*d* are associated.

Figure 2A:
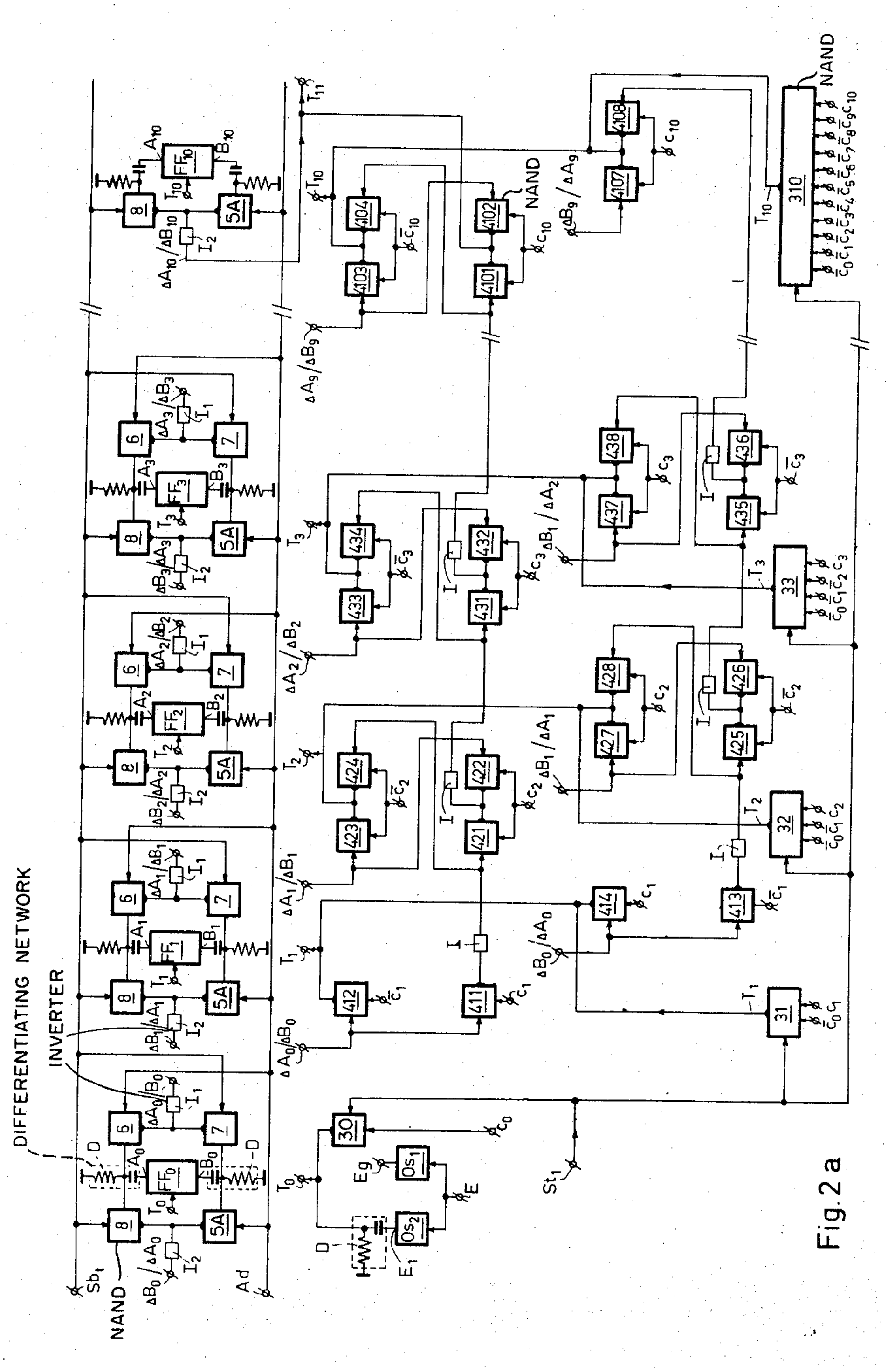
Figures 2B, 2C, 2D:
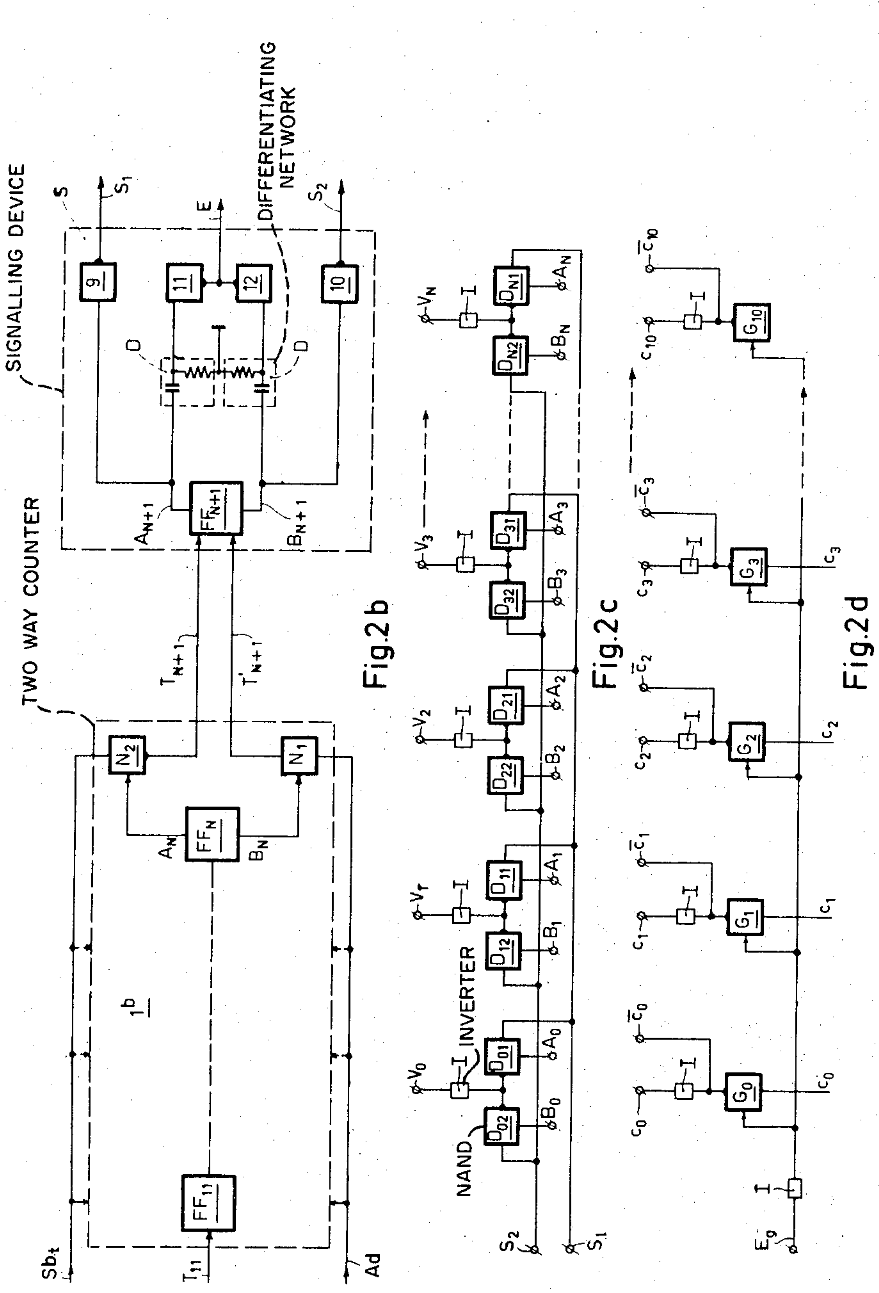

The accumulator portion 1*a*, the sensing circuit 4 and the gate circuit 5 are shown in detail in FIG. 2*a*. FIG. 2*b* shows the accumulator portion 1*b* with a bistable sign flip-flop. FIG. 2*c* shows a read gate circuit. FIG. 2*d* shows an input register circuit.

The accumulator portion 1*a* comprises the bistable flip-flop $FF_o$, ... $FF_{10}$. These flip-flops comprise the outputs $A_o$, $B_o$, $A_1$, $B_1$ respectively etc. These outputs $A_i$, $B_i$ are each connected via differentiating networks D, for example, having a resistor R and a capacitor C, to two Nands 6, 8 and 5A, 7 respectively. The Nands 5 and 6 are furthermore connected to a line Ad which may convey an adding instruction. The Nands 7 and 8 are connected to a line Sbt, which may convey a subtracting instruction. In the case of addition and at a 1-to-0 change-over of the output $A_i$ of a bistable flip-flop $FF_i$ a signal 0 appears at the output of Nand 6. This signal 0 provides after an inverter $I_1$ a signal $\Delta A_i = 1$. In the event of addition and at a 1-to-0 change-over of the output $B_i$ of the output $B_i$ of a bistable flip-flop $FF_i$ a signal appears at the output of Nand 5A. This signal 0 provides after an inverter $I_2$ a signal $\Delta B_i = 1$. In the case of subtraction and at a 1-to-0 change-over of the output $A_i$ of $FF_i$ a signal 0 appears at the output of Nand 8. This signal provides after the inverter $I_2$ a signal $\Delta A_i = 1$. In the case of subtraction and at a 1-to-0 change-over of the output $B_i$ of $FF_i$ a signal 0 appears at the output of Nand 7. After the inverter $I_1$ this signal provides a signal $\Delta B_i = 1$. At the bistable flip-flops these signals are indicated by $\Delta A_i / \Delta B_i$ (at the right) and $\Delta B_i / \Delta A_i$ respectively (at the left). Consequently, an addition and a subtraction are distinguished from one another in the control of the accumulator.

The sensing circuit is formed here by Nands 30, 31, 32 ... 310, to which are applied the aforesaid groups $c_o$; $\bar{c}_o$, $c_1$; ... $\bar{c}_o$, $\bar{c}_1$, ... $c_i$; ... $\bar{c}_o$, $\bar{c}_1$ ... $c_n$ signals of the second binary number $c$.

The gate circuit comprises Nands 411, 412, 413 and 414 for processing the signals $\Delta A_o / \Delta B_o$, $\Delta B_o / \Delta A_o$, $c_1$ and $\bar{c}_1$; the outputs of Nand 31 of the sensing circuit, of Nand 412 or 414 provide the signal $T_1$, that is to say for an addition: $T_1 = \overline{\bar{c}_o \cdot c_1} + \overline{\Delta A_o \cdot \bar{c}_1} + \overline{\Delta B_o \cdot c_1}$ and for a subtraction $T_1 = \overline{\bar{c}_o \cdot c_1} + \overline{\Delta B_o \cdot \bar{c}_1} + \overline{\Delta A_o \cdot c_1}$. In this example the + (= or) function is performed by a through-connection. In dependence upon the integrated circuits employed this is possible or intermediate elements (e.g., an or-gate) have to be included. The gate circuit comprises in this case Nands 421, 422, ... 428 for processing the signals $\Delta A_1 / \Delta B_1$, $\Delta B_1 / \Delta A_1$, $c_2$ and $\bar{c}_2$ and the signals $(\Delta A_o / \Delta B_o) \cdot c_1$ and $(\Delta B_o / \Delta A_o) \cdot \bar{c}_1$ (produced after inversion in the inverter I). The outputs of Nand 32 of the sensing circuit, of Nand 423 or 424, of Nand 427 or 428 provide the signal $T_2$, that is to say for an addition:

$$T_2 = \overline{\bar{c}_o \cdot \bar{c}_1 \cdot c_2} + \overline{\Delta A_o \cdot c_1 \cdot \bar{c}_2} + \overline{\Delta A_1 \cdot \bar{c}_2} + \overline{\Delta B_o \cdot \bar{c}_1 \cdot c_2} + \overline{\Delta B_1 \cdot c_2}$$

and for a subtraction:

$$T_2 = \overline{\bar{c}_o \cdot \bar{c}_1 \cdot c_2} + \overline{\Delta B_o \cdot c_1 \cdot \bar{c}_2} + \overline{\Delta B_1 \cdot \bar{c}_2} + \overline{\Delta A_o \cdot \bar{c}_1 \cdot c_2} + \overline{\Delta B_1 \cdot c_2}.$$

This is continued up to and including the last stage of the accumulator portion 1*a*, that is to say $T_{10}$ is obtained from Nand 310 or 4103 or 4104 or 4107 or 4108. A control-signal $T_{11}$ for the accumulator portion 1*b* is produced either at the output of Nand 4101 or 4102 or at the output $\Delta A_{10} / \Delta B_{10}$ of the bistable flip-flop $FF_{10}$ (an output $\Delta B_{10} / \Delta A_{10}$ of this flip-flop is not used). The operation of said arrangement will be apparent also from the operation described above of the arrangement shown in FIG. 1. The aspects involved in the arbitrary order of additions and subtractions will be dealt with hereinafter. Moreover, the element $0_{s1}$ and $0_{s2}$ and Nand P will be explained. The device starts an arithmetic process by a starting instruction from line $St_1$. FIG. 2*b* shows the accumulator portion 1*b* constructed as a two-way counter with control across the lines Ad and Sbt. The accumulator portion 1*b* is followed for the arbitrary order of additions and subtractions by a signalling device S for assessing the passage of the accumulator through zero. The signalling device S comprises in this case a bistable sign flip-flop $FF_{N+1}$, which is controlled from the last stage of the accumulator. The bistable sign flip-flop $FF_{N+1}$ comprises outputs $A_{N+1}$ and $B_{N+1}$, which are connected through an inverter 9 and 10 respectively to outputs $S_1$ and $S_2$. The outputs $A_{N+1}$ and $B_{N+1}$ are each connected via a differentiating network D by way of an inverter 11 and 12 respectively to an output E. FIG. 2c illustrates how the result can be read from the accumulator. The outputs $A_i$, $B_i$ of the bistable flip-flops of the accumulator are connected to Nands $D_{o1}$, $D_{o2}$, ... $D_{i1}$, $D_{i2}$, $D_{N1}$, $D_{N2}$. The outputs $S_1$ and $S_2$ of the signalling device S of FIG. 2*b* are connected to other inputs of said Nands $D_{i1}$, $D_{i2}$; $S_1$ to $D_{O1}$. $D_{11}$, ... $D_{i1}$, $D_{N1}$ and $S_2$ to $D_{02}$, $D_{12}$, ... $D_{i2}$, ... $D_{N2}$. The outputs of the pairs of Nands $D_{i1}$, $D_{i2}$ are interconnected and form the outputs of the read unit.

Figure 3:
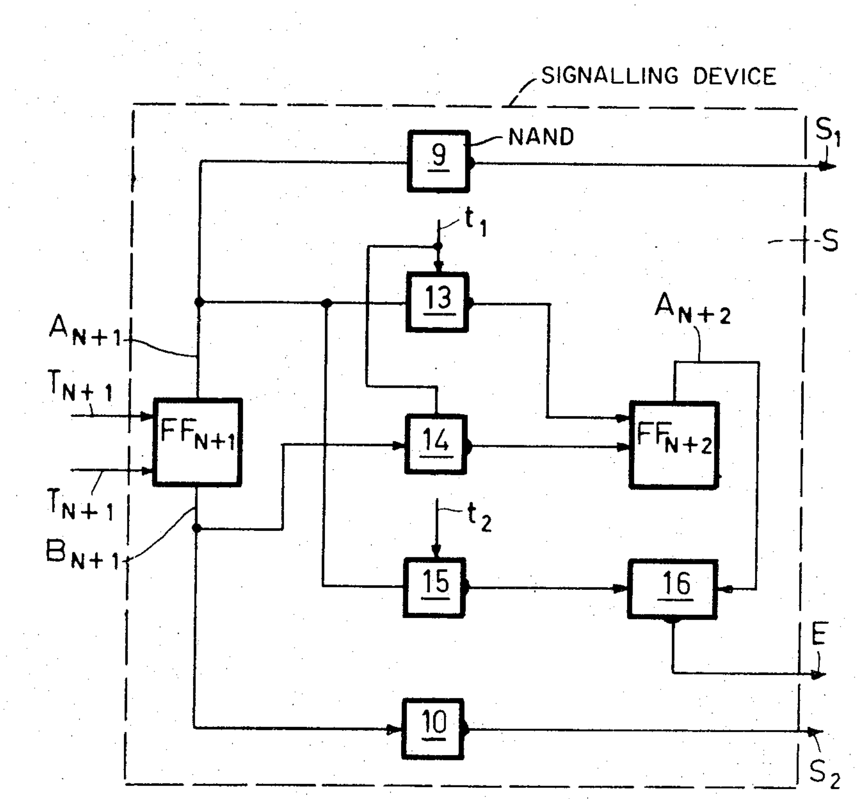
FIG. 3 shows a variant of the component (S) of FIG. 2*b*.
Figures 4, 5:
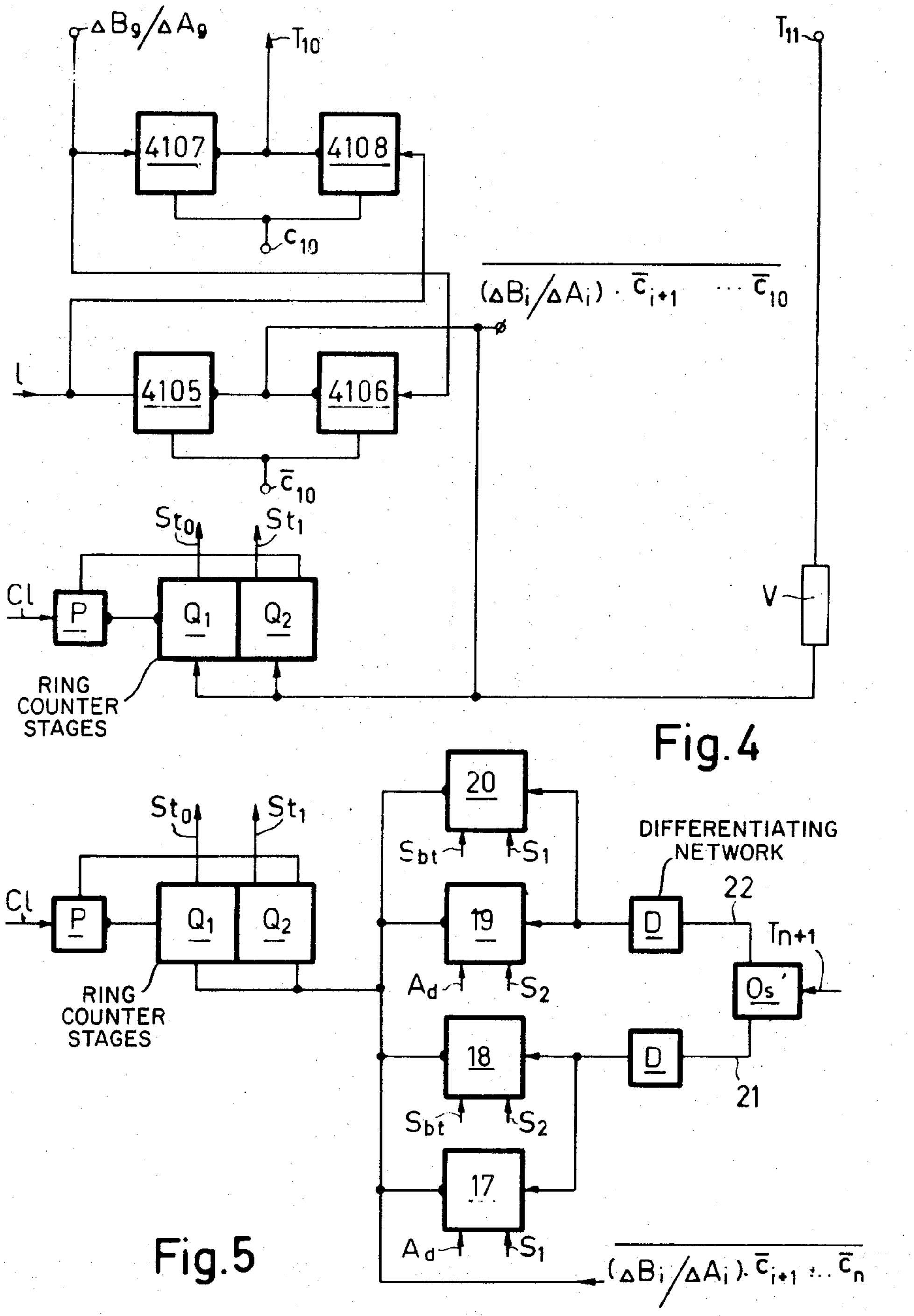
FIGS. 4 and 5 show alternate logic schemes for the arithmetic member adapted to operate with higher speed.

FIG. 2d shows how the bit values of the binary number c can be cut off from input in the arithmetic member in order to enable to add an additional value 1 to the result in the accumulator or to subtract it therefrom at the passage of the accumulator through zero. A signal $E_g$ inverted by an inverter I (originating from the element $0_{S1}$ of FIG. 2*a*) controls the Nands $G_o$, ... $G_i$,... $G_{10}$, to which are applied the bits $c_o$, ... $c_{10}$ of the second binary number $c$. If $E_g = 1$, the Nands $G_o$ ... $G_{10}$ are cut off and hence via the inverter I the signals $c_o$, ... $c_{10}$ are all 0 or $\bar{c}_o$, ... $\bar{c}_{10}$ are all 1. The operation of the arithmetic member shown in FIG. 2 and FIGS. 2*a*, 2*b*, 2*c* and 2*d*, is explained more fully hereinbelow. Normally up to the maximum capacity of the accumulator a value 0 is present in the last bistable flip-flop $FF_N$ of the accumulator. This means $A_N = 0$ and $B_N = 1$. By means of the Nands $N_1$ and $N_2$ it is ensured that in an addition the bistable sign flip-flop $FF_{N+1}$ is in the state 0 ($T_{N+1} = 1$ and $T'_{N+1} = 0$) so that $A_{N+1} = 0$ and via Nand 9 $S_1 = 1$. By this $S_1 = 1$ the Nand gates (see FIG. 2*c*) $D_{01}$, $D_{11}$, ... $D_{i1}$, ... $D_{N1}$ are prepared and pass the $A_o$, ... $A_i$, ... $A_N$ states of the bistable flip-flop of the accumulator. If $A_i = 1$, there appears after inversion in an inverter I a bit value I at the output $V_i$, whereas if $A_i = 0$, a bit value 0 appears. In subtraction the same applies as long as numbers lower than the result present in the accumulator are subtracted. If in subtracting the accumulator passes the zero position from positive to negative, the following occurs: The bistable flip-flop $FF_N$ changes its state and $A_N$ becomes 1 so that $B_N$ becomes 0. Nand $N_2$ is prepared during subtractions so that it supplies $T_{N+1} = 0$, as a result of which the bistable sign flip-flop changes its state and $A_{N+1}$ becomes 1 and $B_{N+1}$ becomes 0. The change-over of $B_{N+1}$ from 1 to 0 is transferred via a differentiating network D and Nand 12 in the form of a signal 0 to the output E. Instead of the output $S_1$, now the output $S_2$ has the signal 1 so that as illustrated in FIG. 2*c* the outputs $B_o$, $B_1$, ... $B_N$ of the accumulator are connected to the outputs $V_o$, ... $V_N$ via Nands $D_{02}$, $D_{12}$, ... $D_{N2}$. This means that a negative number is read. The accumulator has passed from positive to negative through the zero position so that an additional binary number 1 has to be subtracted from the result. For this purpose in this embodiment the signal 0 of output E (FIG. 2*b*) is applied to the elements $O_{S1}$ and $O_{S2}$ of FIG. 2*a*. $O_{S1}$ and $O_{S2}$ may be monostable flip-flops. $0_{S1}$ supplies, due to this 0-signal, a signal $E_G$ after a short time, which signal subsequent to inversion cuts off the Nands $G_o$, ... $G_{10}$ shown in FIG. 2*d* and thus produces the binary number 0 to be supplied to the arithmetic member. Immediately thereafter $0_{S2}$ supplies a signal $E_1$, which produces via a differentiating network D a control-signal $T_O$ for controlling the bistable flip-flop $FF_o$. Because the subtraction control is still energized, a binary number 1 is then subtracted from the result in the accumulator. If during addition the accumulator passes the zero position from negative to positive, the same occurs, but the bistable flip-flop $FF_N$ changes over from 1 to 0, which means that $A_N = 0$ or $B_N = 1$. By this $B_N = 1$ and the Ad line having a signal 1 (addition), $T'_{N+1}$ receives a 0 signal so that the bistable sign flip-flop changes over and $A_{N+1} = 0$ and $B_{N+1} = 1$. Thus again the $A_O$ ... $A_N$ states of the bistable flip-flops are read ($S_1 = 1$) and via the Nand 11 a 0-signal is supplied at the output E. As described above an additional binary number 1 is thus added to the result in the accumulator with the aid of the elements $O_{S1}$ and $O_{S2}$. FIG. 3 shows a slight modification of the signalling device S of FIG. 2*b*. With a sequence of additions and subtractions the state of the bistable sign flip-flop $FF_{N+1}$ is transferred at the beginning $t_1$ of a sequence via Nands 13 and 14, prepared by $t_1$, to a bistable flip-flop $FF_{N+2}$. The latter retains the initial state of flip-flop $FF_{N+1}$. At the termination of a sequence of additions and subtractions at the instant $t_2$, the actual state of $FF_{N+1}$ is compared via a Nand 15 prepared by $t_2$ with that of $FF_{N+2}$ by means of a Nand 16. If the states (herein $A_{N+1}$ and $A_{N+2}$) are equal, no 0-signal appears at the output E of gate 16. If the states are unequal, a 0 -signal does appear at the output E so that in dependence upon the state of the bistable sign flip-flop $FF_{N+1}$ an additional binary number 1 is added to or subtracted from the result in the accumulator. It is thus avoided that at each passage of the accumulator through zero an additional value 1 should be added or subtracted, which means an economy in time. After the termination of a sequence the result is corrected, if necessary. FIG. 4 illustrates how a higher speed of operation can be attained, if it is considered that the actual processing time of an addition (or subtraction) is mainly determined by the change-over times of the bistable flip-flops changing their states. FIG. 4 shows that the output $T_{11}$ of the control-device of FIG. 2*a* and the output of said control-device where the signal $\Delta B_i$ (or $\Delta A_i$ with subtraction)$\cdot \bar{c}_{i+1} \cdot \bar{c}_{i+2}, \ldots \bar{c}_n$ is produced as the result of a change-over of an ordinally higher preceding bistable flip-flop, are connected to a starting pulse generator $Q_1$, $Q_2$, P. The signal $(\Delta B_i/\Delta A_i)\cdot^{al}\bar{c}_{i+1} \cdot \bar{c}_n$ is formed in the last stage of the control-device by applying the signal via the line 1 (see also FIG. 2*a*) to a Nand 4105 and the signal $\Delta B_9/\Delta A_9$ to a Nand 4106. These Nands 4105 and 4106 also receive the signal $\bar{c}_{10}$ so that at the combined outputs the signal $(\Delta B_9/\Delta A_9)\cdot \bar{c}_{10}$ or, if $(\Delta B_9/\Delta A_9) = 0$, the signal $(\Delta B_8/\Delta A_8)\cdot\bar{c}_9\cdot\bar{c}_{10}$ etc. appear. This signal indicates the instant at which the last bistable flip-flop has changed its state. If this last change-over occurs in the last bistable flip-flop of the accumulator portion 1*a*, this is signalled to the accumulator portion 1*b* by the control-signal $T_{n+1}$. If one of the two signals appears, this means that a new arithmetic operation can start. It is not necessary to wait until a time has elapsed which is equal to the sum of the change-over times of all bistable flip-flops. If there is provided an accumulator portion 1*b* the transfer of the signal $T_{n+1}$ (in this case $T_{11}$) has to be delayed via a network V by a time equal to that required by the portion 1*b* for attaining its final position. The latter may be very soon if a known, so-called synchronous counter is used. The starting pulse generator may comprise a gate P through which a clock pulse is applied through the line $C_1$ to a ring counter having stages $Q_1$ and $Q_2$. This clock pulse produces in the portion $Q_1$ a signal at the line $St_o$, which serves to prepare (not shown) the second binary number *c* for an addition (or subtraction) process. The second clock pulse produces in the portion $Q_2$ a starting pulse (see FIG. 2*a*) across the line $St_1$. Thus the adding (subtracting) process is started and a further output of portion $Q_2$ cuts off the gate P for further clock pulses. When the signal $(\Delta B_i/\Delta A_i)\cdot\bar{c}_n$ or $T_{n+1}(=T_{11})$ appears, the ring counter is reset and hence the gate P is released and so on.

FIG. 5 finally illustrates what has to be done, if it is desired to perform additions and subtractions in arbitrary order. The potential passage of the accumulator through zero requires steps to avoid that a reset signal for said ring counter $Q_1$, $Q_2$ should be supplied too soon by the appearance of the control-signal $T_{n+1}$. This step consists in that four Nand gates 17, 18, 19 and 20 are provided. To the gate 17 are connected the adding instruction line, the $S_1$ output of the bistable sign flip-flop ($FF_{n+1}$, see FIG. 2*b*) and through a differentiating network D the output 21 of a monostable flip-flop OS' serving as a delay circuit, which delays the signal $T_{n+1}$ by a time as required for the accumulator portion 1*b*, if any, to attain its final state. In the case of addition and if the state of the accumulator is positive (Ad = 1 and $S_1 = 1$), a signal $T_{n+1}$ can produce a reset of the ring counter $Q_1$, $Q_2$ and hence a new start. The same applies to gate 18, to which are connected the subtraction instruction lines Sbt, the output $S_2$ of the bistable sign flip-flop and also the output 21 of the monostable flip-flop Os'. In the case of subtraction and if the state of the accumulator is negative (Sbt = 1 and $S_2 = 1$), a signal $T_{n+1}$ can give rise to a new start.

To gate 19 are connected the adding instruction line, the output $S_2$ of the bistable sign flip-flop and via a differentiating network D the output 22 of a monostable flip-flop Os', serving as a delay circuit delaying the signal $T_{n+1}$ to an extent such that an end-around carry can be completed at the passage of the accumulator through zero. In the case of addition and when the accumulator is negative a signal $T_{n+1}$ is delayed additionally. If the latter occurs an additional 1 is added to the result (see the foregoing). Then the whole process runs normally. If no end-around carry occurs, $T_{n+1}$ becomes available after the delay for actuating a next-following start. The same applies to gate 20 in subtraction when the state of the accumulator is positive. In this embodiment the signal $(\Delta B_i/\Delta A_1)\cdot\bar{c}_{i+1}$ ... $\bar{c}_n$ is, of course, also available and its effect is the same as in the device shown in FIG. 4.

What is claimed is:

1. A binary addition arithmetic member comprising an accumulator receiving a first binary number, the accumulator formed by a plurality of bistable flip-flops having states characterized by 0 and 1, an input register for receiving a second binary number, a control-device having inputs to which are connected the outputs of the accumulator and the outputs of the input register, said control-device producing control-signals for setting an adding result in the accumulator so that in order of succession the bistable flip-flops of said accumulator at the consecutive bit places of the accumulator change their states, said state changes starting from a 0-to-1 change-over of a preceding bistable flip-flop, a next-following corresponding bit place of the second binary number has a bit value 1 and for which, starting from a 1-to-0 change-over of a preceding bistable flip-flop a next-following corresponding bit place of the second binary number has a bit value 0, said control-device comprising a sensing circuit for sensing the least significant bit place at which said second binary number has a bit value 1, means connecting outputs of said sensing circuit corresponding to the respective bit places of the binary number to the corresponding inputs of said accumulator, means providing a starting pulse from said sensing circuit to said accumulator to cause the bistable flip-flop of the accumulator to change its state which said bistable flip-flop corresponds ordinally to the said least significant bit place where the second binary number has a bit value 1, said control-device further including a gate circuit coupled to said accumulator, said gate circuit, together with said sensing circuit, satisfying the following logical equation, so that a control-signal is obtained at an output $T_i$ for controlling an $i^{th}$ bistable flip-flop of the accumulator, where $T_i$=

$$\overline{\bar{c}_o \cdot \bar{c}_1 \ldots \bar{c}_{i-1} \cdot c_i} +$$

$$\overline{\Delta A_o \cdot c_1 \ldots c_{i-1} \cdot \bar{c}_i} + \overline{\Delta A_1 \cdot c_2 \ldots c_{i-1} \cdot \bar{c}_i} + \ldots + \overline{\Delta A_{i-2} \cdot c_{i-1} \cdot \bar{c}_i} +$$

$$\overline{\Delta A_{i-1} \bar{c}_i}$$

$$\overline{\Delta B_o \bar{c}_{i-1} \cdot \bar{c}_i + \Delta B_1 \cdot \bar{c}_2 \ldots \bar{c}_{i-1} \cdot c_i} + \ldots$$

$\overline{+\Delta B_{i-2}\cdot \bar{c}_{i-1}\cdot c_i+\Delta B_{i-1}\, c_i}$ wherein $c_0, c_1, \ldots$ are the bit values of the ordinally consecutive bit places of the second binary number and $\Delta A_i$ and $\Delta B_i$ represent 1-to-0 change-overs of the complementary outputs $(A_i, B_i)$ of an $i^{th}$ bistable flip-flop of the accumulator.

2. A binary adding arithmetic member as claimed in claim 1 suitable for adding and subtracting binary numbers in arbitrary order wherein said bistable flip-flops of said accumulator are provided with addition-subtraction control means, whereby in said logical equation in the case of subtraction $A_i$ can be replaced by $\Delta B_i$ and $\Delta B_i$ by $\Delta A_i$, the arithmetic member further comprising a signalling device coupled to said accumulator and responsive to the passage of said accumulator as a whole through the zero position, said signalling device comprising a bistable sign flip-flop which provides a further binary number 1 to be subtracted from the result in said accumulator at a passage of the accumulator through zero by subtraction and which provides a further binary number 1 to be added to the result in the accumulator at a passage of the accumulator through zero by an addition from negative to positive.

3. A binary adding and subtracting arithmetic member as claimed in claim 2, wherein said signalling device comprises an additional bistable flip-flop responsive to the state of said bistable sign flip-flop at the beginning of a sequence of additions and subtractions, the addition or subtraction of said further binary number 1 being performed only after said sequence, when the state of the bistable sign flip-flop differs from the state of said additional bistable flip-flop.

4. A binary adding arithmetic member as claimed in claim 1 suitable for adding and subtracting binary numbers in arbitrary order, wherein said input register is provided with a gate circuit for applying, in the case of subtraction, said second binary number in inverted form to said arithmetic member, whereby in the logical equation $c_i$ can be replaced by $\bar{c}_i$ and $\bar{c}_i$ by $c_i$, the arithmetic member further comprising a signalling device responsive to the negative-positive passage of said accumulator through zero which provides a further binary number 1 to be added to the result in the accumulator at each subtraction.

5. A binary adding and subtracting arithmetic member as claimed in claim 4, wherein said signalling device comprises a two-way counter which registers the number of times of subtractions and of the negative-positive passages of the accumulator through zero occuring in a series of additions and subtractions, the state of said two-way counter after one such series being added to the result in the accumulator.

6. A binary adding arithmetic member as claimed in claim 1, wherein the output of the control-device for the control-signal $(T_{n+1})$ from the last stage of the control-device and the output of the control-device for the signal $(\Delta B_i \cdot \bar{c}_{i+1} \cdot \bar{c}_{i+2} \ldots c_n)$ produced in the last stage due to an actual change-over of an ordinally higher preceding bistable flip-flop are connected to start means for providing a starting pulse $(P, Q_1, Q_2)$, which supplies a starting pulse $(St_1)$ after one of said signals has appeared.

7. A binary adding and subtracting arithmetic member as claimed in claim 6, further including a plurality of and-gates, to an input of each of which are connected an output of a bistable sign flip-flop, an adding or subtracting instruction line and the control-signal $(T_{n+1})$ from the last stage of said control-device, the output of said gates coupled to said means providing a starting pulse, said means providing a starting pulse coupled to said accumulator for reactivation at the end of a prior operation, said gates responsive to a coincidence of inputs for passing the control-signal $(T_{n+1})$ from the last stage of said control-device to said means providing a starting pulse, after the passage of the accumulator through zero, when the adding or subtracting process has completely finished.

* * * * *